(12) United States Patent
Smith

(10) Patent No.: US 10,217,285 B2
(45) Date of Patent: Feb. 26, 2019

(54) HUD OBJECT DESIGN AND METHOD

(71) Applicant: Charles Anthony Smith, Bowie, MD (US)

(72) Inventor: Charles Anthony Smith, Bowie, MD (US)

(*) Notice: Subject to any disclaimer, the term of this patent is extended or adjusted under 35 U.S.C. 154(b) by 0 days.

(21) Appl. No.: 14/786,094

(22) PCT Filed: May 29, 2014

(86) PCT No.: PCT/US2014/039987
§ 371 (c)(1),
(2) Date: Oct. 21, 2015

(87) PCT Pub. No.: WO2014/194066
PCT Pub. Date: Dec. 4, 2014

(65) Prior Publication Data
US 2016/0071320 A1 Mar. 10, 2016

Related U.S. Application Data

(60) Provisional application No. 61/828,745, filed on May 30, 2013.

(51) Int. Cl.
*G06T 19/00* (2011.01)
*G06T 19/20* (2011.01)
(Continued)

(52) U.S. Cl.
CPC .......... *G06T 19/006* (2013.01); *G02B 27/017* (2013.01); *G02B 27/22* (2013.01);
(Continued)

(58) Field of Classification Search
CPC ......... G06T 19/006; G06T 11/00; G06T 7/62; G06T 17/00; G06T 19/00; G06T 2210/04;
(Continued)

(56) References Cited

U.S. PATENT DOCUMENTS 9,129,404 B1 * 9/2015 Wagner .................. G06Q 30/00
2002/0175911 A1 * 11/2002 Light ...................... G06T 17/00
345/419

(Continued)

*Primary Examiner* — Sultana M Zalalee
(74) *Attorney, Agent, or Firm* — The Law Firm of Andrea Hence Evans, LLC

(57) ABSTRACT

The invention features a rectangular 3-D modeling grid called a display environment that may be mapped to one or more sensor(s) to provide a heads up display device the ability to generate and view an Augmented Reality first; person view of custom 3-D objects. Location sensors create the positioning and perimeter of the display environment. The Display Environment may be navigated by the combination of the display device's physical movement sensed by motion sensors and the display device's physical location based on its proximity to synchronized location sensors. Sensors on the display device recognize when the device is moving with respect to the Display Environment to initiate re-rendering of its 3-D model being displayed. Movement of the display device enable first person 3-D model illustrative and perspective views which may also be used to design 3-D models with customizable scale, orientation, positioning physics, and artificial intelligence.

27 Claims, 15 Drawing Sheets

(51) Int. Cl.
*G02B 27/01* (2006.01)
*G02B 27/22* (2018.01)

(52) U.S. Cl.
CPC ........ *G06T 19/20* (2013.01); *G02B 2027/014* (2013.01); *G02B 2027/0134* (2013.01); *G02B 2027/0138* (2013.01); *G02B 2027/0178* (2013.01); *G02B 2027/0187* (2013.01); *G06T 2219/024* (2013.01); *G06T 2219/2016* (2013.01)

(58) Field of Classification Search
CPC ......... G06T 2215/16; G06T 3/40; G06T 7/60; G02B 2027/014; G02B 27/017; G06F 1/163; G06F 3/011; G06F 3/012
See application file for complete search history.

(56) References Cited

U.S. PATENT DOCUMENTS

| | | | | | |
|---|---|---|---|---|---|
| 2003/0179218 | A1* | 9/2003 | Martins | ................... | G06T 19/00 345/633 |
| 2011/0216060 | A1* | 9/2011 | Weising | ................... | G09G 5/08 345/419 |
| 2011/0304703 | A1* | 12/2011 | Ito | ......................... | G06T 19/006 348/47 |
| 2012/0287284 | A1* | 11/2012 | Jacobsen | ................. | G06F 1/163 348/158 |
| 2013/0083173 | A1* | 4/2013 | Geisner | ................... | G06F 3/013 348/51 |
| 2014/0306993 | A1* | 10/2014 | Poulos | ................. | G06T 19/006 345/633 |

* cited by examiner

HUD OBJECT DESIGN AND METHOD

CROSS-REFERENCE TO RELATED APPLICATIONS

This application claims priority to, the benefit of, and is related to, the Applicant's provisional application, U.S. Provisional Patent Application No. 61/828,745 titled "HUD Object Design and Method," filed May 30, 2013.

FIELD OF THE INVENTION

The present invention relates, in general, to a head-up display (HUD) Augmented Reality (AR) Display Environment which can design three dimensional objects, add properties to the objects and show views of the object based on the movement of a HUD device and/or its inter-relationship with location sensor(s).

BACKGROUND OF THE INVENTION

Three dimensional (3-D) rendering refers to wire frame 3-D models that have been plotted to X, Y and Z grid lines and then converted to a 2-D image with 3-D effects. Although 3-D rendered objects are commonly seen, 3-D modeling software is required to create and render them. However, the software does not present the objects in a first person Augmented Reality (AR) view. Augmented reality (AR) is a live view of a physical real-world environment whose elements are simulated (or altered) by computer-generated software. Current Augmented Reality display methods require a camera for image recognition to display 3-D models. Also, this method limits the ability to display large scaled 3-D models. Using Cameras instead of sensors can potentially cause users to experience rendering latencies, and range of view point limitations. Further, in some instances, unique properties of the objects make it difficult to simulate physical or visual characteristics. Current modeling software can be too complex and produce A further aspect of an embodiment of the invention features a heads up display's point of view rendered by software of a handheld or wearable device.

An aspect of an embodiment of the invention provides a user friendly system that can create a high quality 3-D model.

A further aspect of an embodiment of the invention features a rectangular grid which is based on the positioning of stationary sensor(s) to define X, Y, Z axes.

A further aspect of an embodiment of the invention features software having a user interface which is navigated by the combination of the HUD's physical movement sensed by motion sensors and its physical location as it relates to the proximity of synchronized stationary sensor(s).

A further aspect of an embodiment of the invention features a motion sensor on the HUD which can calculate the user's view of rendered 3-D objects based on the movement of the HUD.

Additional aspects, objectives, features and advantages of the present invention will become apparent from the following description of the preferred embodiments with reference to the attached drawings.

BRIEF DESCRIPTION OF THE DRAWINGS

FIG. 9 illustrates an example of the display device location synchronization process according to an aspect of an embodiment of the present invention.

DETAILED DESCRIPTION OF THE INVENTION

Figure 1:
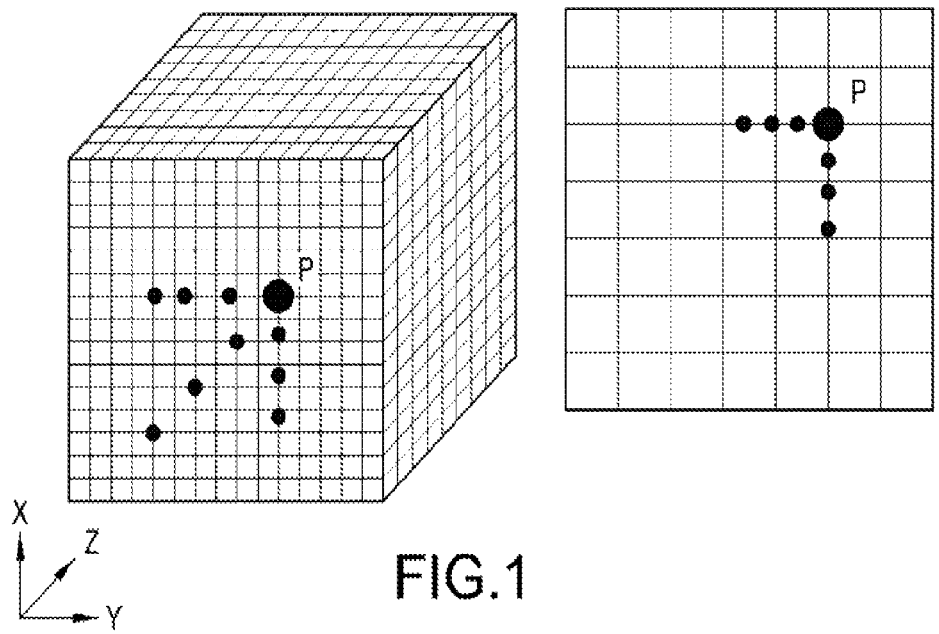
FIG. 1 illustrates an exemplary rectangular Cartesian grid.

Aspects of the present invention are directed to systems, methods and computer program products for enabling a first person augmented reality view, design and development of 3-dimensional objects. In one aspect of an embodiment of the present invention, computer program product for causing a computer to enable a first person augmented reality view of 3-dimensional objects is disclosed. The computer program product, as envisioned in this aspect, may include a computer usable medium having control logic stored on it for causing a computer to enable a first person augmented reality view of 3-dimensional objects. The control logic may include computer readable program code for a variety of operations including: initializing communication between a display device and one or more sensors, receiving sensor data from the one or more sensors, generating an augmented reality environment using data from the one or more sensors, incorporating a 3-dimensional target object within the augmented reality environment, applying a Cartesian coordinate grid to the augmented reality environment, and displaying the target object within the augmented reality environment in a first person augmented reality view.

In an aspect of an embodiment of the present invention, the control logic may include computer readable program code for enabling manipulation of the target object.

In an aspect of an embodiment of the present invention, the control logic may include computer readable program code for changing the display of the target object to reflect a change in the position and/or orientation of the display device.

In another aspect, computer readable program code for enabling a global positioning system to assist in reflecting the change in the display device's position and/or orientation may also be contemplated.

In an aspect of an embodiment of the present invention, the sensor data may include information or data regarding the target object's physical characteristics, scale, position and/or orientation.

In an aspect of an embodiment of the present invention, the control logic may include computer readable program code for enabling superimposition of a 3-dimensional image over the augmented reality environment.

In an aspect of an embodiment of the present invention, the augmented reality environment may be generated by virtue of the one or more sensors' positioning.

In another aspect of an embodiment of the present invention, the control logic may include computer readable program code for providing a virtual representation of the Cartesian coordinate grid.

In an aspect of an embodiment of the present invention, the virtual representation of the Cartesian coordinate grid may be implemented by the synchronization between the display device and the one or more sensors.

In another aspect of an embodiment of the present invention, the control logic may include computer readable program code for defining a display origin point using a real time and/or actual position of the one or more sensors.

In another aspect of an embodiment of the present invention, the control logic may include computer readable program code for rendering real time effects to simulate photorealistic user interfaces.

In another aspect of an embodiment of the present invention, the control logic may include computer readable program code for generating an inner dimension user point of view of the augmented reality environment thereby enabling the user to view and navigate within the augmented reality environment. Here, in one instance, the user will appear to be able to walk through and/or interact with the augmented reality environment as it is being projected on the display device.

In yet another aspect of an embodiment of the present invention, the control logic may include computer readable program code for enabling application of physical attributes to the target object. An additional aspect contemplates computer readable program code for enabling application of physical attributes to the augmented reality environment itself.

In yet another aspect of an embodiment of the present invention, the control logic may include computer readable program code for simulating effects of the application of physical attributes on the target object and computer readable program code for displaying the simulated effects of the physical attributes on the target object.

In yet another aspect of an embodiment of the present invention, the target object may be an image of an actual object as captured by the display device. In one aspect, an image of the target object may be captured by the display device's camera. In another aspect, the image may be uploaded onto the display device.

In yet another aspect of an embodiment of the present invention, the target object may be a 3-dimensional design created within the augmented reality environment by a user.

In yet another aspect of an embodiment of the present invention, the system can upload 3-dimensional models from external sources.

In yet another aspect of an embodiment of the present invention, the control logic may include computer readable program code for enabling motion capturing and proximity sensing by the display device.

In yet another aspect of an embodiment of the present invention, the control logic may include computer readable program code for enabling participation of multiple users within the augmented reality environment. This may include, in one aspect, computer readable program code for enabling co-designing by the multiple users.

In yet another aspect of an embodiment of the present invention, the control logic may include computer readable program code for enabling simulation of zooming in towards or zooming out from the target object by the display device.

In yet another aspect of an embodiment of the present invention, the control logic may include computer readable program code for simulating a user's perspective sightline of the augmented reality environment. This code may include, in one aspect, code for combining the display device's location and the augmented reality environment's properties with the display device's focal point.

In yet another aspect of an embodiment of the present invention, the control logic may include computer readable program code for enabling navigation of the augmented reality environment. Here, in yet another aspect of an embodiment of the present invention, the computer readable program code may include computer readable program code for sensing motion by the display device, and computer readable program code for determining the position of the display device in relation to its proximity to the one or more sensors.

In yet another aspect of an embodiment of the present invention, the control logic may include computer readable program code for generating and displaying possible target object outcome based on application of user defined physical properties.

In yet another aspect of an embodiment of the present invention, the control logic may include computer readable program code for generating sound playback based on the display device's change in its proximity to the augmented reality environment.

In yet another aspect of an embodiment of the present invention, the control logic may include computer readable program code for determining a display origin point. In one aspect, this computer readable program code may further include computer readable program code for determining the width and length variables of a positioning layout formed by the one or more sensor(s) and computer readable program code for dividing the width and length variables by 2. The positioning layout, may, for example, be rectangular in shape in which case, the display origin point may be determined by dividing each of the length and width values by 2.

A head-up display or heads-up display, also known as a HUD, is any transparent display that presents data without requiring users to look away from their usual viewpoints. The present invention combines a head up display with custom computer aided design (CAD) software enabling users to have unique 3-dimensional (3-D) models displayed in an augmented reality environment. Furthermore the HUD will have motion capturing and proximity sensing functionality. The software required for this invention may be stored internally or externally. Internally, the custom CAD software can be locally stored and processed within the built in CPU of the HUD device. Alternatively, with HUD devices like Google Glass, for example, that simply displays content from external devices (cell phone, PC, web server) the custom CAD software used may be stored and processed outside of the HUD Device. It should be noted that HUD devices as mentioned in the present invention are not limited to only heads up displays but may also include wearable devices and other mobile devices that are capable of displaying a transparent and/or simulated augmented reality first person point of view. HUD devices that display transparent augmented reality views can use transparent LED display technology to view reality with 3-D images superimposed over it. Devices that simulate a HUD's first person 3-D point of view, may render an image superimposed over a view of reality captured by the device's internal or external camera. An example may be a tablet that is displaying a first person view of a 3-D environment that is augmenting a user's perspective of reality captured by (or viewed through) the device's internal camera. The devices and HUDs of the present invention may be referenced interchangeably from here on as display device(s) and/or HUD(s).

Referring now to FIG. 1, an exemplary rectangular Cartesian grid is shown. A Cartesian coordinate system for a three-dimensional space may involve choosing an ordered triplet of lines (axes), any two of them being perpendicular; a single unit of length for all three axes; and an orientation for each axis, as shown in FIG. 1. As in the two-dimensional case, each axis becomes a number line. The coordinates of a point, p are obtained by drawing a line through point p perpendicular to each coordinate axis, and reading the points where these lines meet the axes as three numbers of these number lines, as shown in FIG. 1. These coordinate systems are primarily used for designing 3-D models using Computer Aided Design (CAD) or 3-D modeling software. In this invention augmented reality environments are generated by leveraging sensor positioning instead of image recondition which would leverage a camera's line of sight. Here, the coordinate system may be displayed with the exact positioning of locations in reality as enabled by location sensors.

Figure 2:
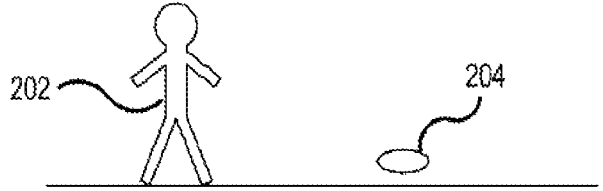
FIG. 2 illustrates a user positioning a location sensor according to an aspect of an embodiment of the present invention.

Referring now to FIG. 2, a user 202 is shown positioning a location sensor 204 according to an aspect of an embodiment of the present invention. Here, user 202 is shown along with sensor 204. There may be one or more sensors 204 as discussed below. Location sensor(s) 204 may be any proximity sensor(s) that a display device can recognize or sense their physical presence because of the display device's recognition software capabilities. Location sensor(s) 204 are mainly leveraged to provide users the ability to define an augmented reality environment's physical characteristics, scale, position and/or orientation.

Figure 3:
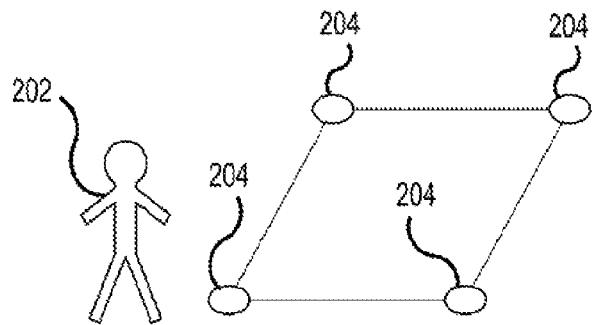
FIG. 3 illustrates a user positioning multiple location sensors according to an aspect of an embodiment of the present invention
Figure 4:
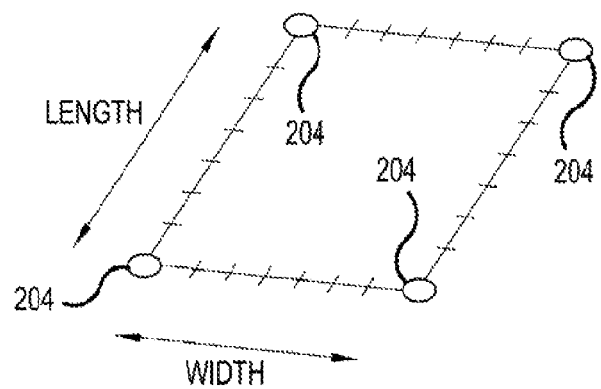
FIG. 4 illustrates an example of the sensor synchronization process according to an aspect of an embodiment of the present invention
Figure 5:
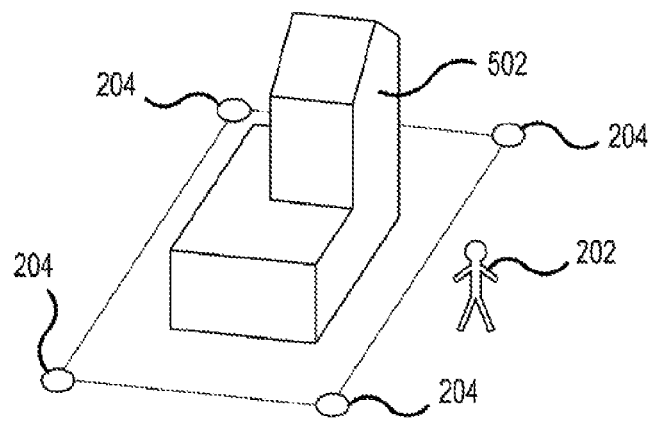
FIG. 5 illustrates a deployed display environment according to an aspect of an embodiment of the present invention

Referring now to FIGS. 3, 4 & 5, a user 202 positioning multiple location sensors 204, an example of the sensor synchronization process and a deployed display environment according to aspects of embodiments of the present invention are all shown. Location sensors 204 may be positioned with spacing as big or as small as user 202 can place them on a flat surface and the display device can sense them. Location sensor(s) 204 are placed strategically to simulate an exact duplicate of a real world environment's size and dimensions, as shown. This enables the generation of augmented reality environments capable of rendering accurate scaled 3-D models or target object 502 as big as a sky scraper or as small as a penny as seen in FIG. 5. Location sensors 204 may be placed on a flat surface to define the boundary or perimeter dimensions of a user's workspace. Sensors 204 synchronize with the display device to provide a virtual representation of base points of a rectangular Cartesian grid's physical position. The display device's software locates or synchronizes with location sensor(s) 204 by utilizing an internal or external display device sensor. During the synchronization process the software calculates the distances between the sensors to capture the augmented reality environment dimension capabilities/limitations as they correspond with real capabilities/limitations.

Figure 6:
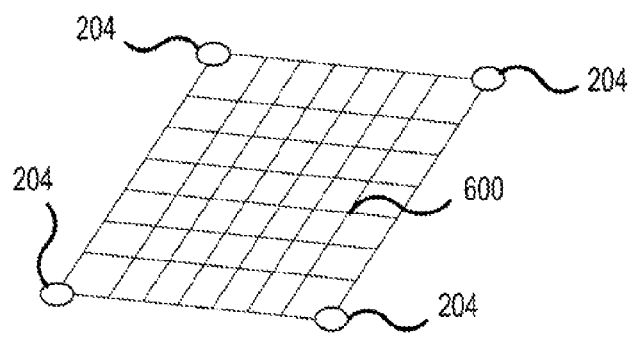
FIG. 6 illustrates a user identifying a Multiple Sensor Origin using a formula according to an aspect of an embodiment of the present invention.

As shown in FIG. 4, the sensor synchronization process of calculating distances and or proximity between sensors uses a computer generated virtual lateral line from one sensor to another then applies notches. The notches generated are counted to measure the total measurable virtual units (centimeters, inches, feet, etc.) they have between each other. Lines and notches generated from the synchronization process are hidden by default from the display devices user interfaces, but can be viewed if user requested. The user specified length and width between each sensor enables the verification that the workspace has the proper size capabilities and the sensors have correct parallel placement for the intended project. The result of the synchronization is a computer generated 3 axes, 3-D rectangular grid called an augmented reality environment or Display Environment 600, as seen in FIG. 6. Display Environment 600 may be mapped to one or more stationary sensor(s) 204 to create an augmented reality display area or workspace. Display Environment 600 may be primarily used to display and/or design augmented reality objects, applications, or Operating Systems.

Figure 7:
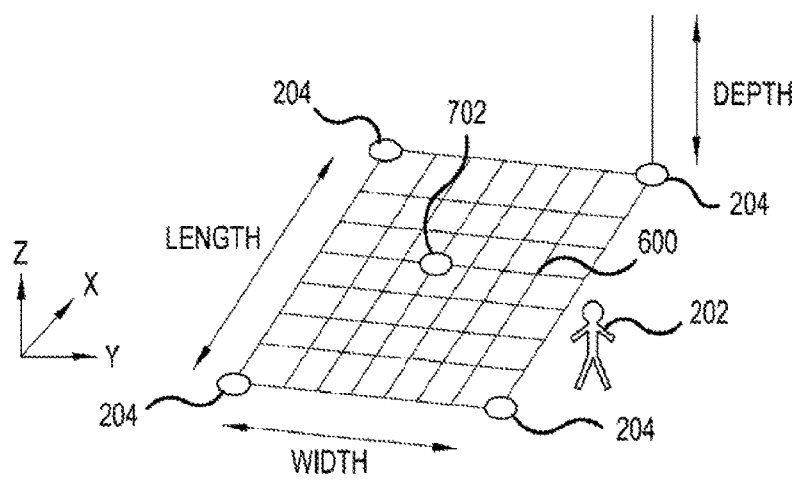
FIG. 7 illustrates a user identifying a Single Sensor Origin using a formula according to an aspect of an embodiment of the present invention.
Figure 8:
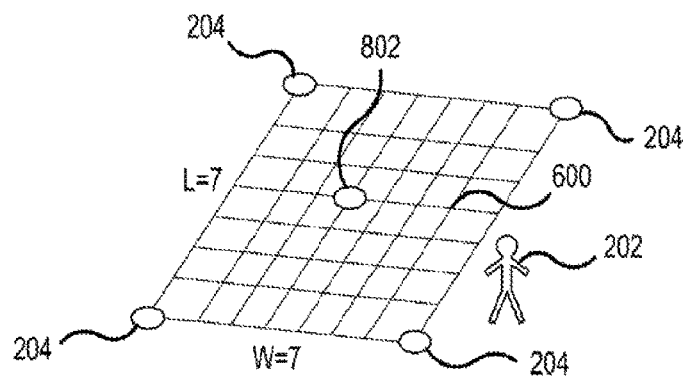

Referring now to FIGS. 7 & 8 user 202 is shown identifying a Single Sensor Origin (SSO) 702 using a formula in FIG. 7 according to an aspect of an embodiment of the present invention while FIG. 8 illustrates deployment of a large scaled environment according to an aspect of an embodiment of the present invention.

Deploying Display Environment 600 requires Single Sensor Origin (SSO) 702 or Multiple Sensor Origin (MSO) 802 to define its Display Origin Point(s). Display Origin Points can either be a single location in reality defined by the locations of the SSO or multiple sensors positioned as a rectangular set of points to define the physical perimeter of the display environment. The point of Single Sensor Origin (SSO) 702 is based on one sensor that is placed at user 202's desired physical location to automatically identify Display Environment 600's origin value as (0,0,0) and the Display Environment 600's software deployment point. The SSO is used as the midpoint for setting Display Environment 600's length and width. SSO 702 is also used as the base point of Display Environment 600's height or depth. The length, width and height (or depth) values may be set manually by user 202. This enables the software to calculate SSO 702 or MSO 802 as its Display Environment 600's origin and then automatically generate a 3-D rectangular perimeter from it using user 202's length, width, and height (or depth) values, as seen in FIGS. 7 and 8, respectively. Using MSO 802 to deploy Display Environment 600 requires the software to use one sensor as a temporary origin, and then calculate that origin's distance from two other adjacent sensors creating length and width values. This calculation provides a physical point in reality for the software to generate MSO 802. MSO 802 is the center point value of multiple sensors 204, primarily four which may be combined in a rectangular configuration. The four sensors' length and width value are divided in half to set x and y variable values of MSO 802, as seen in FIG. 8. For example if x=width/2 and y=length/2 then point of MSO 802 would equal the coordinate (X,Y,Z). For MSO calculations the z, variable has a default value of 0, until the user defines a height value for the Display Environment.

(MSO) Process Example:
1. Place four sensors to define the four corners of the display environments rectangular shape
2. Calculate the length and width variables of the rectangles four sides Example: L=12 W=6
3. Calculate the x and y variable values by taking the length and width a dividing them by 2 Example:
   X=(12/2); Y=(6/2)
   X=6 Y=3 Z=0
   MSO=(6,3,0)
4. The software stores the MSO Point calculated previously to the Display Environments Properties Once Display Environment 600's Display Origin Point(s) are set user 202 may define a list of Environment characteristics called Display Environment Properties. Display Environment Properties is a software generated menu which enables user 202 to manage a list of attribute values to be applied to Display Environment 600. Attributes stored may include metadata about Display Environment 600's physical and interactive capabilities. Some examples of Properties that can be stored but are not limited to are the MSO; the SSO; Environment Length; Environment Width; Environment Height: max X axis value; max Y axis value; and max Z axis value; Display Environment 600's visible characteristics are also determined by the attributes set by these Properties.

Figure 9:
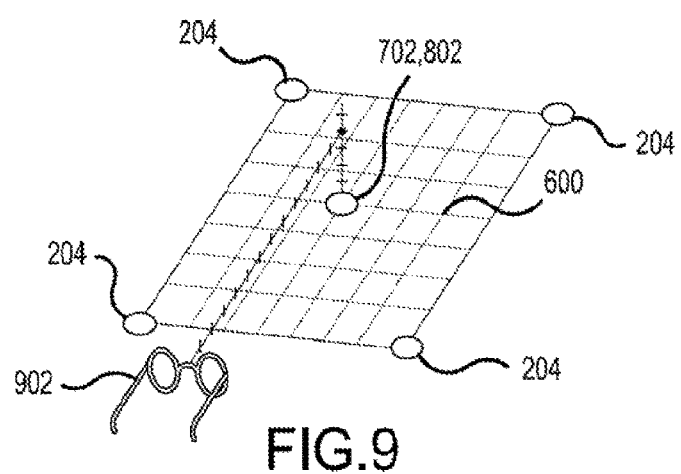
FIG. 9 illustrates deployment of a large scaled environment according to an aspect of an embodiment of the present invention.

Referring now to FIG. 9, an example of a display device 902's location synchronization process according to an aspect of an embodiment of the present invention is shown. Display device 902's location may be determined from the combination of the distance and height values calculated from display device 902 to Display Environment 600's sensor(s) 204. The result of this calculation is called the HUD sensor synchronization process as seen in FIG. 9. The HUD Sensor Synchronization process is identical to the previous sensor synchronization process except it uses line notches drawn from location sensors 204 to display device 902 for its measurements. Display device 902's distance and height are measured by using the HUD sensor synchronization process to generate a lateral line from display device 902 that intersects a vertical line from either MSO 802 or SSO 702. Display device 902's distance is measured by counting the lateral notches from the display device 902 to the vertical intersecting point of SSO 702 or MSO 802. Display device 902's height may be measured by counting the vertical notches from the lateral intersecting point of SSO 702 or MSO 802 to display device 902. Display device 902's location is also a dynamic calculation because its value changes as user 202 (who would be using display device 902) changes the display devices physical location and/or orientation. The recalculation is initiated by a signal received by the display device 902's motion capturing sensing capabilities.

Figure 10:
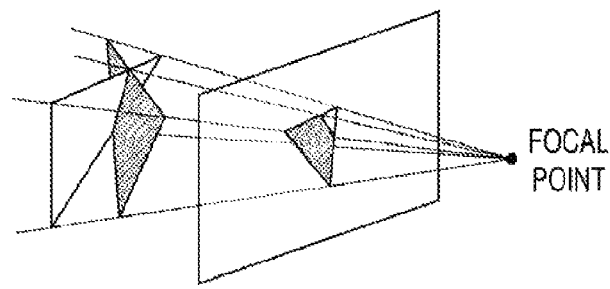
FIG. 10 illustrates exemplary 3-D rendering and projection.
Figure 11:
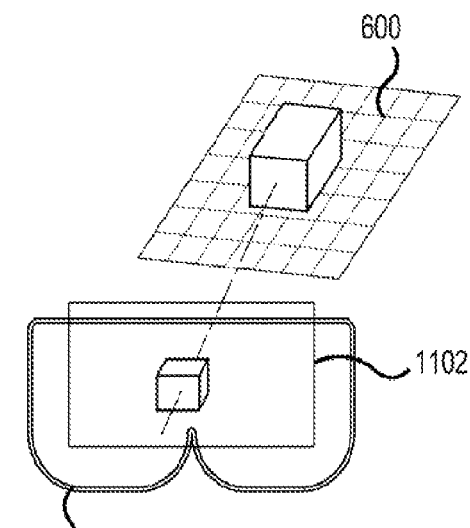
FIG. 11 illustrates a display device point of view (POV) with a focal point and line of sight from the display device's $1^{st}$ person's perspective according to an aspect of an embodiment of the present invention.
Figure 12:
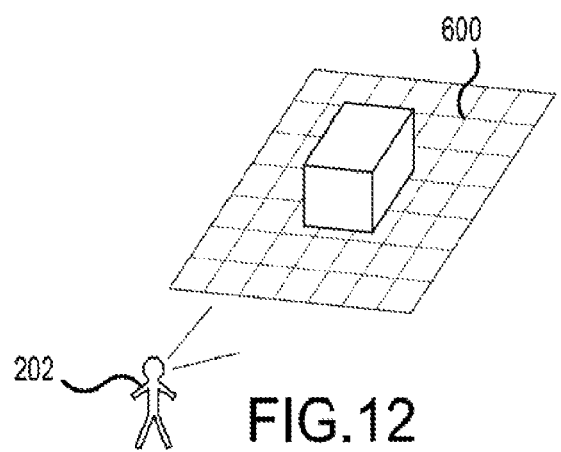
FIG. 12 illustrates a display device POV with a focal point and line of sight from the display device's $3^{rd}$ person's perspective according to an aspect of an embodiment of the present invention.

Referring now to FIGS. 10-12, an exemplary 3-D rendering and projection, display device 902's point of view (POV) with focal point and line of sight from the display device 1st person and display device 902's POV with focal point and line of sight from the display device 3rd person according to aspects of embodiments of the present invention are all shown.

Display Device User interface (UI) 1102 referenced as the Point of view (POV), utilizes the computer graphics process of 3-D rendering to automatically convert 3-D wire frame models to 2-D images. The points on the 3-D wire model are plotted on the Display Environment then display device 902's software applies real time 3-D rendering affects to simulate photorealistic user interfaces, as seen in FIG. 10. POV 1102 simulates user 202's first person point of view of reality with 3-D rendered objects. Furthermore POV 1102 displays aspects of Display Environment 600 by using 3-D projection and Orthographic Projection to display a 2-D image as a Picture Plane as seen in FIG. 11 and FIG. 12. The picture plane is a generated perpendicular plane to the sightline from the display device 902's focal point and the display environment. A perspective projection Focal Point is the center or origin of user 202's view. Display device 902's location and the Display Environment's properties are combined with the focal point to simulate the sightline of user 202's perspective, as seen in FIGS. 11 and 12.

Figure 13:
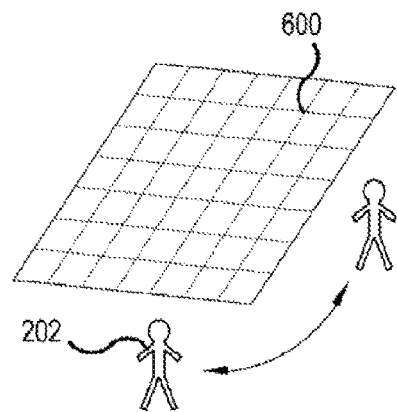
FIG. 13 illustrates a user's display device POV viewing a display environment with proximity changes according to an aspect of an embodiment of the present invention.
Figure 14:
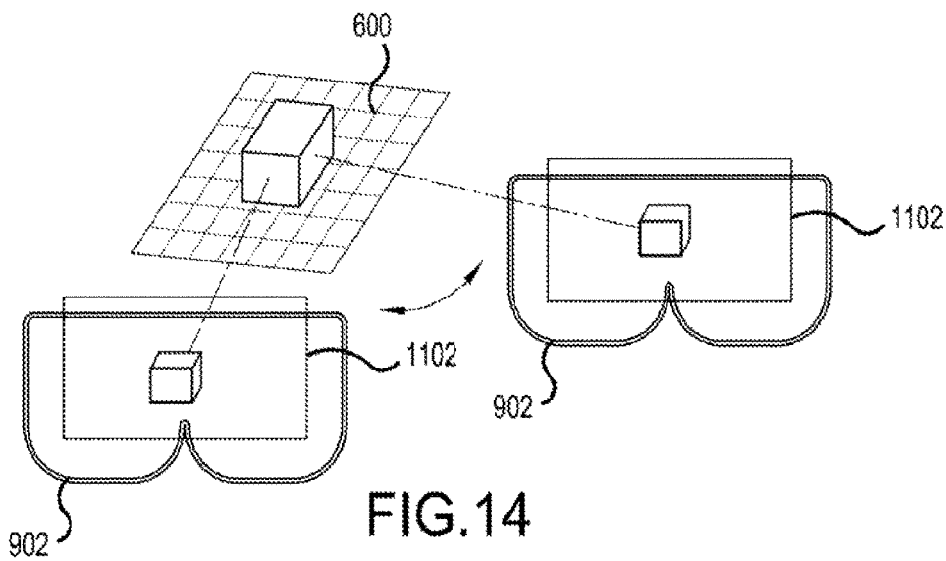
FIG. 14 illustrates motion capturing and image changing with sightline from a $1^{st}$ person's view according to an aspect of an embodiment of the present invention.
Figure 15:
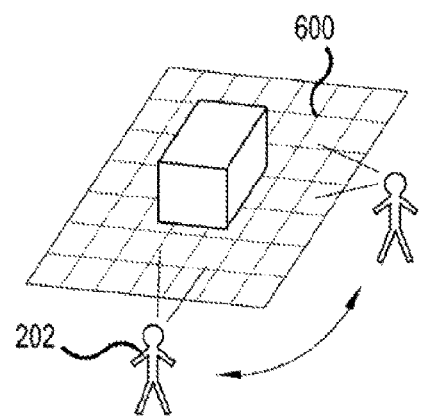
FIG. 15 illustrates motion capturing and image changing with sightline from a $3^{rd}$ person's view according to an aspect of an embodiment of the present invention.

Referring now to FIGS. 13-15, a display POV viewing a display environment with proximity changes, a display featuring motion capturing and image changing with sightline from a 1st person's view and a display featuring motion capturing and image changing with sightline from a 3rd person's view according to aspects of embodiments of the present invention are all shown.

Motion capture technology may be used to recalculate display device 902's sightline because of sensed changes in the display device 902's proximity to Display Environment 600. As user 202 changes the devices proximity to the display environment the motion is captured and the software re-renders the image projected by display device 902, as seen in FIGS. 13-15. The re-rendering simulates Display Environment 600's navigation by re-calculating the point where the display device 902's POV sightline 1102 meets Display Environment 600, as seen in FIGS. 14 and 15.

Figure 16:
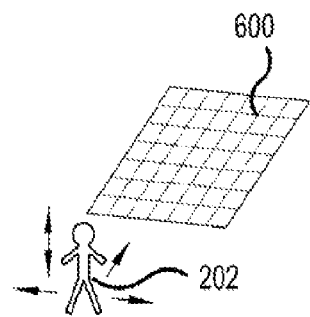
FIG. 16 illustrates a display environment 3-D direction navigation from a $3^{rd}$ person's perspective according to an aspect of an embodiment of the present invention.
Figure 17:
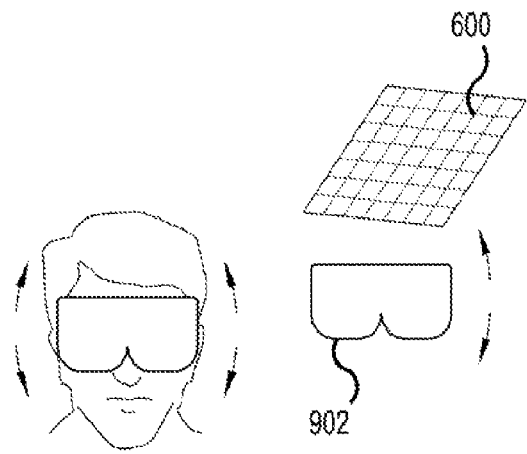
FIG. 17 illustrates a $1^{st}$ person's POV head tilt motion capture view effect according to an aspect of an embodiment of the present invention.
Figure 18:
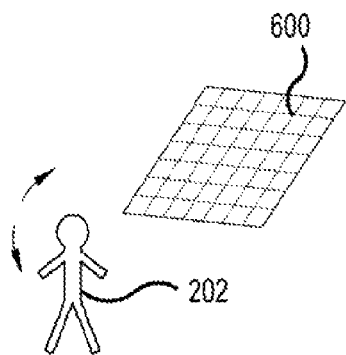
FIG. 18 illustrates a $3^{rd}$ person's POV head tilt motion capture view effect according to an aspect of an embodiment of the present invention.

Referring now to FIGS. 16-18, a display environment's 3-D direction navigation from a 3rd person's perspective and a $1^{st}$ & $3^{rd}$ person's POV head tilt motion capture view effect according to aspects of embodiments of the present invention are shown. Display environment navigation generates the effect of real world three dimensional movements and views of up, down, left, right, forward, and backwards, as seen in FIG. 16. Users are also able to see views at tilted angles as seen in FIGS. 17 and 18.

Figure 19:
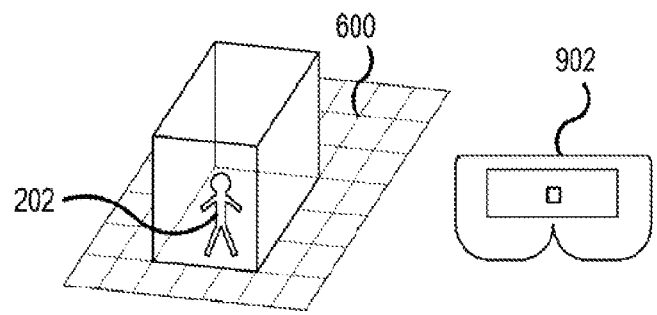
FIG. 19 illustrates an inner location POV example from a $1^{st}$ and $3^{rd}$ persons' perspective according to an aspect of an embodiment of the present invention.
Figure 20:
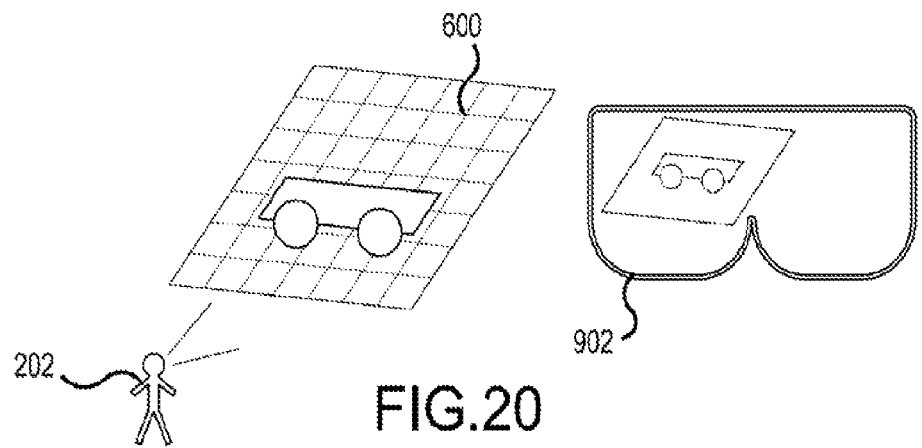
FIG. 20 illustrates an outer location POV example from a $1^{st}$ and $3^{rd}$ persons' perspective according to an aspect of an embodiment of the present invention.

Referring now to FIGS. 19 and 20, inner and outer location POV examples from a 1st and 3rd persons' perspectives according to aspects of embodiments of the present invention are both shown. Location perspective simulates user 202's ability of being inside or outside of Display Environment 600's perimeter. In scenarios where a large scaled display environment is deployed and display device 902's location may be measured to be within the perimeter of Display Environment 600, the image displayed will adjust to generate an inner dimension POV. The inner dimension POV adjusts the user's sightline to show Display Environment 600 from the inside out with 360 degree lateral and vertical range of view. For example a display environment with multiple sensors spaced wide enough to generate a 3-D model of a large building, user 202 could potentially navigate or view all inner and outer angles of the model, as seen in FIG. 19 and FIG. 20. If a user's display device lateral sightline does not meet any of the display environment's coordinates, an image will not be displayed—thereby simulating the user as not looking at the environment or objects.

Figure 21:
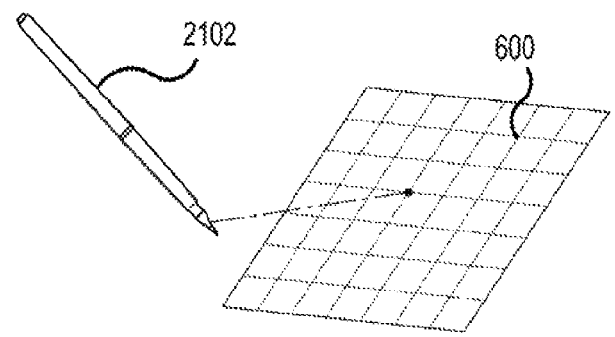
FIG. 21 illustrates an example of an interaction device synchronization process according to an aspect of an embodiment of the present invention.
Figure 22:
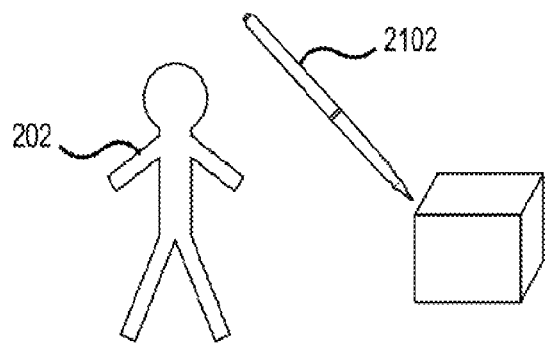
FIG. 22 illustrates a HUD first person's view of a user's hand using an interaction device to interact with an object according to an aspect of an embodiment of the present invention.
Figure 23:
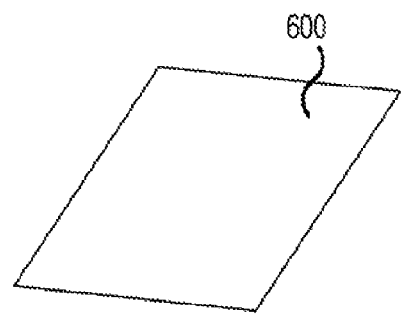
FIG. 23 illustrates a design user interface user interface from $3^{rd}$ person POV view with no grid lines according to an aspect of an embodiment of the present invention.
Figure 24:
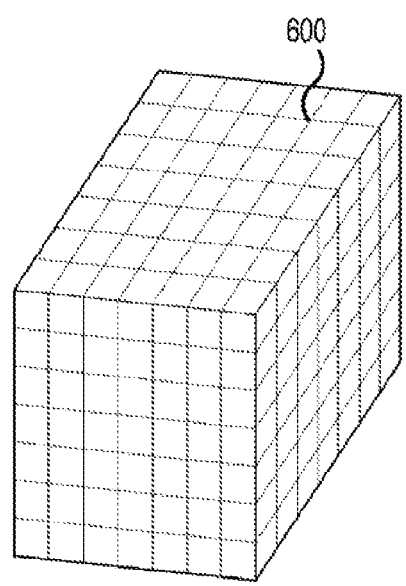
FIG. 24 illustrates a design user interface from 3$^{rd}$ person POV view with toggled grid lines according to an aspect of an embodiment of the present invention.
Figure 25:
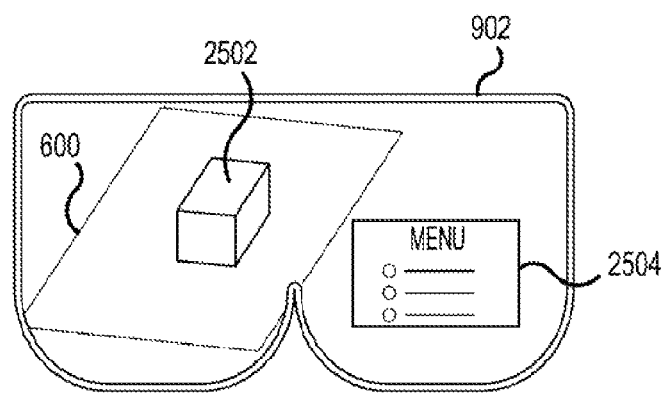
FIG. 25 illustrates a design user interface's alternate display environment view no grid lines according to an aspect of an embodiment of the present invention.
Figure 26:
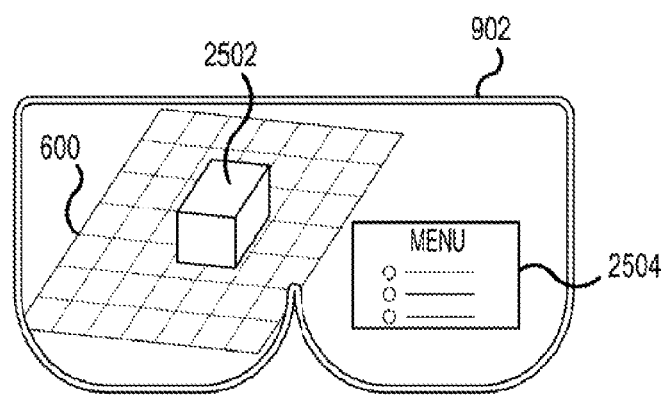
FIG. 26 illustrates a design user interface's alternate display environment view with grid lines according to an aspect of an embodiment of the present invention.

Referring now to FIGS. 21 and 22, an example of an interaction device synchronization process and user 202 using interaction device 2102 according to aspects of embodiments of the present invention are shown. Interaction Devices 2102 include peripherals that synchronize with display device 902's software to capture software commands input by users 202. Furthermore interaction devices 2102 allow users to manipulate display environment interfaces and 3-D models by utilizing the device synchronization process to capture the interaction device's location coordinates for generating software commands viewable by user POV 1102. The device synchronization process is utilized identically to the HUD Sensor Synchronization process, except a peripheral is used instead of a display device, as seen in FIG. 21. Also, some devices may include (but are not limited to) a stylus wand; keyboard; mouse; handheld remote controller; devices that capture hand, eye or body movement; and brain computer interface (BCI) devices. The Interaction Device software command input functionality is processed similar to the previous method of displaying a user's POV of a Display Environment, in which the Interaction device's physical proximity to the Display Environment is captured then instead of an image being rendered the software processes a command at the device's location, as seen in FIG. 22.

Referring now to FIGS. 23-27, a design user interface from 3rd person's POV view with no grid lines, a design user interface from 3rd person's POV view with toggled grid lines, a design user interface's alternate display environment view with no grid lines, a design user interface's alternate display environment view with grid lines and a user designing step by step 1-D to 3-D object plus skewing and resizing according to aspects of embodiments of the present invention are all shown.

Figure 27:
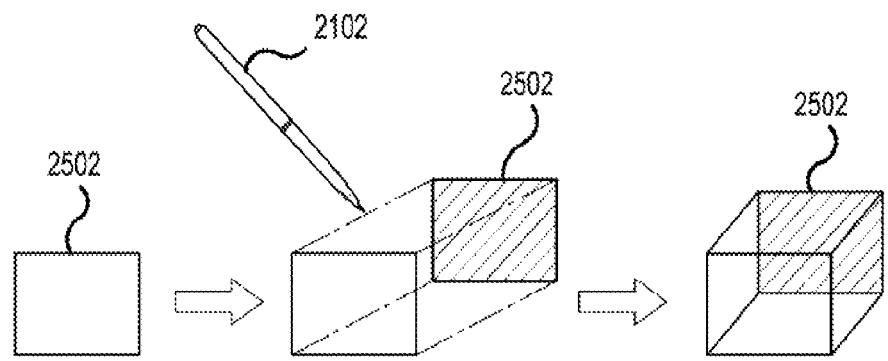
FIG. 27 illustrates a user designing step by step 1-D to 3-D object plus skewing and resizing according to an aspect of an embodiment of the present invention.

Objects may be designed and displayed in the display environment 600 with specific attributes to simulate real world physical dimensions, textures and other features. Users are able to view and, or manipulate multiple display environment viewpoints and the orientation of the objects as they design them. A Design Interface 2504 provides multiple object creation tools that are used to design objects from the software commands initiated by the use of interaction devices. Utilizing the display device's synchronization with Display Environment 600, users can design and manipulate 3-D objects based on specific points on the Display Environment 600. 3-D objects referenced in the present invention are 3-D models plotted on a software generated Cartesian coordinated system represented as the Display Environment 600. During the object design process users will have the ability to toggle on and off an alternate Display Environment view of a transparent grid for enhanced object design accuracy, as seen in FIGS. 23-26. Custom CAD software aspects are provided through a Design interface that provides user(s) with a first person perspective during the 3-D object design process. This process leverages the defining of single dimensional (1-D) shapes by specifying physical characteristics such as length, width and height, or radius. For example some general 1-D shapes would be a circle, square or triangle. These 1-D shapes are modified to create 3-D models such as cones, boxes, and spheres. The 3-D models are then customized to capture physical characteristics such as size, and unique shape, as seen in FIG. 27. The 1-D shape can also be designed using a basic freehand or straight line drawing tool that users utilize to define a shapes physical characteristics. A user's design perspective is based upon the display devices POV as it changes its proximity to Display Environment 600.

Figure 28:
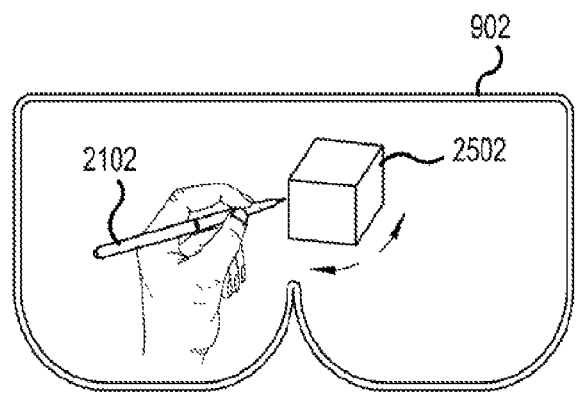
FIG. 28 illustrates rotating an object's orientation from 1$^{st}$ person POV according to an aspect of an embodiment of the present invention.
Figure 29:
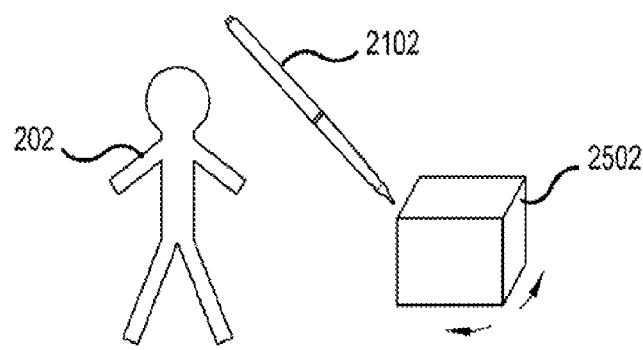
FIG. 29 illustrates rotating an object's orientation from 3$^{rd}$ person POV according to an aspect of an embodiment of the present invention.

Referring now to FIGS. 28-31, rotating an object's orientation from a 1st and 3rd person display device 902's POV, snap points 3002 from $1^{st}$ and $3^{rd}$ person's POV based on user proximity all according to aspects of embodiments of the present invention are shown. Snap points which are similar to Autodesk's AutoCAD Object Snaps (Osnaps), may be used in conjunction with other CAD software commands to draw and manipulate objects accurately. Snap Points allow one to snap onto a specific object location to specify it as a point of interaction. Since users see objects displayed on the display device based on proximity, users will have to physically navigate around the display environment for a better POV, or adjust the 3-D object's orientation by using interactive devices with the Snap Points to move or rotate the requested object, as seen in FIGS. 28 and 29.

Figure 30:
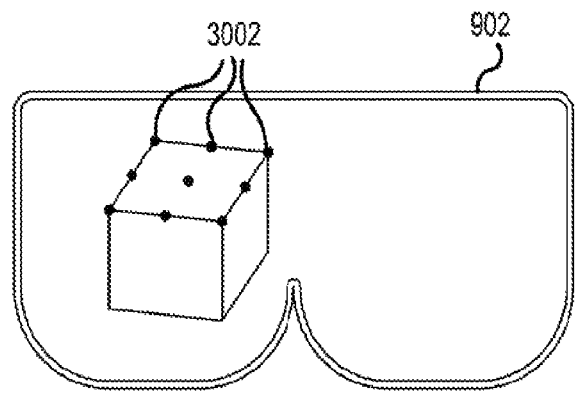
FIG. 30 illustrates viewing snap points from 1$^{st}$ person POV based on user proximity according to an aspect of an embodiment of the present invention.
Figure 31:
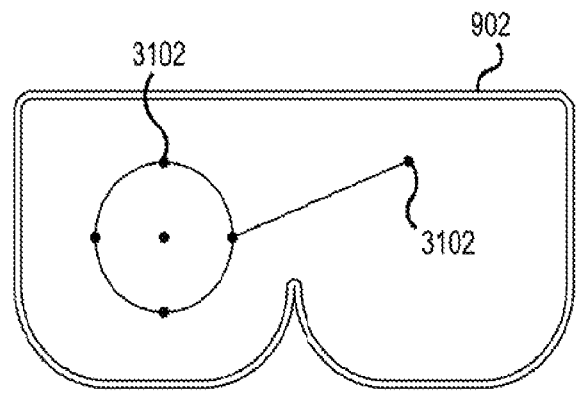
FIG. 31 illustrates viewing snap points from 3$^{rd}$ person POV based on user proximity according to an aspect of an embodiment of the present invention.

In addition, Snap Points can accurately snap to the end point of a line or the center of a circle to draw other line segments to be part of a 3-D object's unique shape, as seen in FIGS. 30 and 31.

Figure 32:
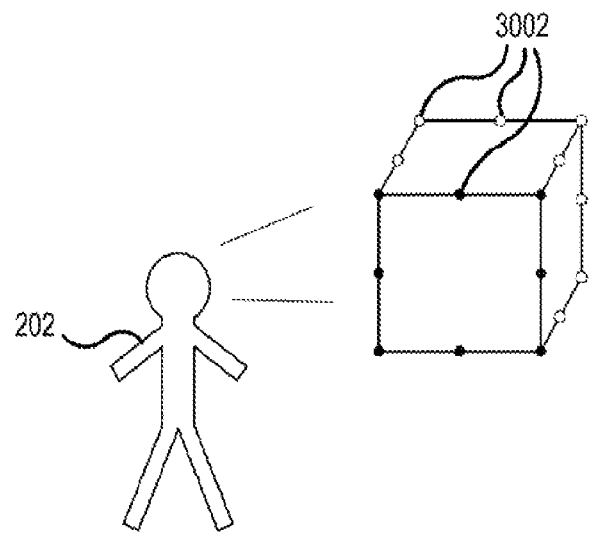
FIG. 32 illustrates navigating/change of view to alternate snap points from 1st person POV according to an aspect of an embodiment of the present invention.
Figure 33:
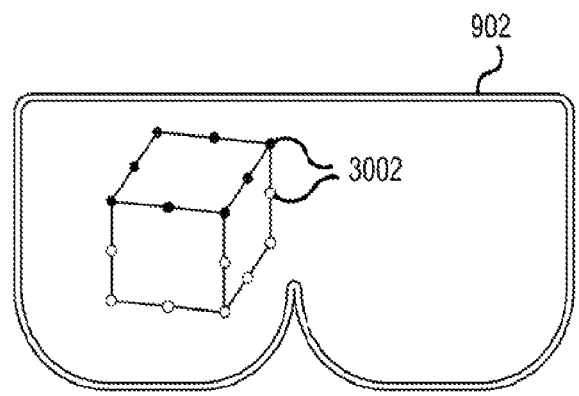
FIG. 33 illustrates navigating/change of view to alternate snap points from 3rd person POV according to an aspect of an embodiment of the present invention.

Referring now to FIGS. 32-33, navigating/change of view to alternate snap points from a 1st person and 3rd person's POV according to an aspect of an embodiment of the present invention are shown. As the display device's proximity changes, the Snap points 3002 may appear visible or invisible. This creates the user experience of seeing points on a 3-D object that only prohibits interaction based a user's point view or the object's orientation, as seen in FIG. 32 and FIG. 33.

Figure 34:
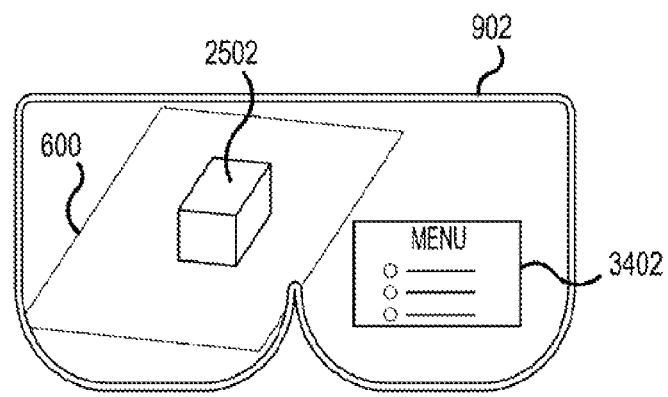
FIG. 34 illustrates adding physical properties using a menu according to an aspect of an embodiment of the present invention.
Figure 35:
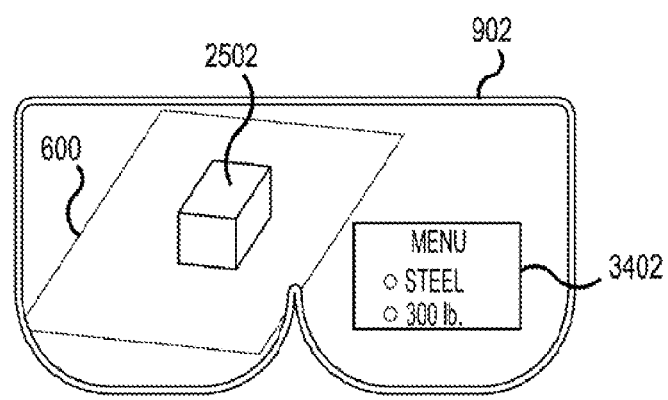
FIG. 35 illustrates effects of physical properties objects with texture and gravity according to an aspect of an embodiment of the present invention.

Referring now to FIGS. 34-35, FIG. 34 illustrates adding physical properties using a menu according to an aspect of an embodiment of the present invention while FIG. 35 illustrates the assignment of physical properties objects with texture and gravity according to an aspect of an embodiment of the present invention. Physical properties user interface (UI) 3402 may be used to assign physical attributes to previously designed 3-D objects. This user interface presents a menu of attributes assigned by users to simulate the objects physical or visual characteristics, as seen in FIG. 34 some attributes may include but are not limited to the attributes listed in Table 1 below:

TABLE 1

| Absorption | electrical | location | radiance |
|---|---|---|---|
| albedo | electrical impedance | luminance | solubility |
| angular momentum | electric field | Luminescence | specific heat |
| area | electric potential | luster | resistivity |
| brittleness | emission | malleability | reflectivity |
| boiling point | flow rate | magnetic field | refractive index |
| capacitance | fluidity | magnetic flux | spin |
| color | frequency | mass | strength |
| concentration | hardness | melting point | stiffness |
| density | inductance | moment | temperature |
| dielectric | Intrinsic impedance | momentum | tension |
| ductility | intensity | opacity | thermal conductivity |
| distribution | irradiance | permeability | velocity |
| efficacy | length | permittivity | viscosity |
| elasticity | pressure | plasticity | volume wave impedance |

The physical properties are recognized by the software to cause a variety of object reaction and interactions initiated by display device 902's software or interaction device. The calculated reactions of the 3-D objects are predefined by selectable and customizable physics engines processed by the software to provide an approximate simulation of real world responses or different types of physical systems. In one aspect of an embodiment of the present invention, the physics engine may generate a calculated outcome to simulate real world physical reaction. The physics engine may be a part of the software or software resident on either the device(s) or externally.

Display device 902's software allows user 202 to have a first person perspective of objects in different simulated environments to see how they react. The simulated environments can include the effects of the object in a real life setting including temperate and environmental effects, as seen in FIG. 36.

In one aspect of an embodiment of the present invention, a Display Layer Index may be used to filter and order how objects and reactions/solutions are viewed by the user. Each layer may be ordered by a specific index number with "0" being the bottom and all numbers proceeding the stacked above it. Layers can be turned off (made invisible) reordered (re-indexed) deleted or locked (cannot be modified).

Figure 36:
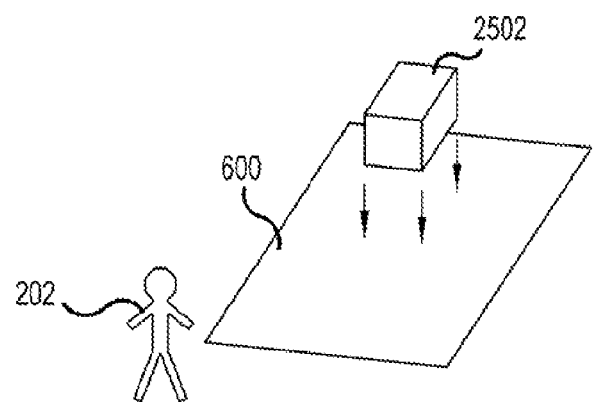
FIG. 36 illustrates a user's 3$^{rd}$ person view of gravity physics being applied to an object through a physics engine according to an aspect of an embodiment of the present invention.
Figure 37:
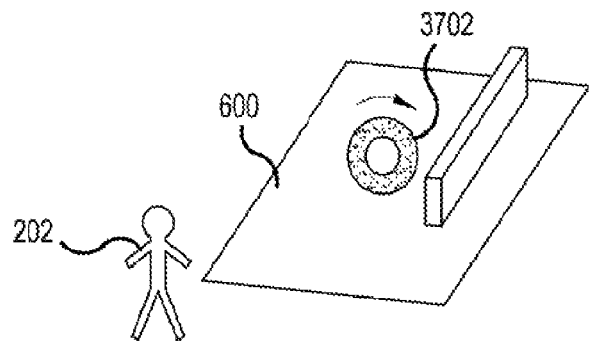
FIG. 37 illustrates object thought animation capture step by step from a 1$^{st}$ person's POV according to an aspect of an embodiment of the present invention.

Referring now to FIGS. 36 & 37, FIG. 36 illustrates a user's $3^{rd}$ person view of gravity physics being applied to an object 2502 by a physics engine according to an aspect of an embodiment of the present invention while FIG. 37 illustrates user's $3^{rd}$ person view of a physics engine simulation of collision and collision detection effects on an object according to an aspect of an embodiment of the present invention.

Figure 38:
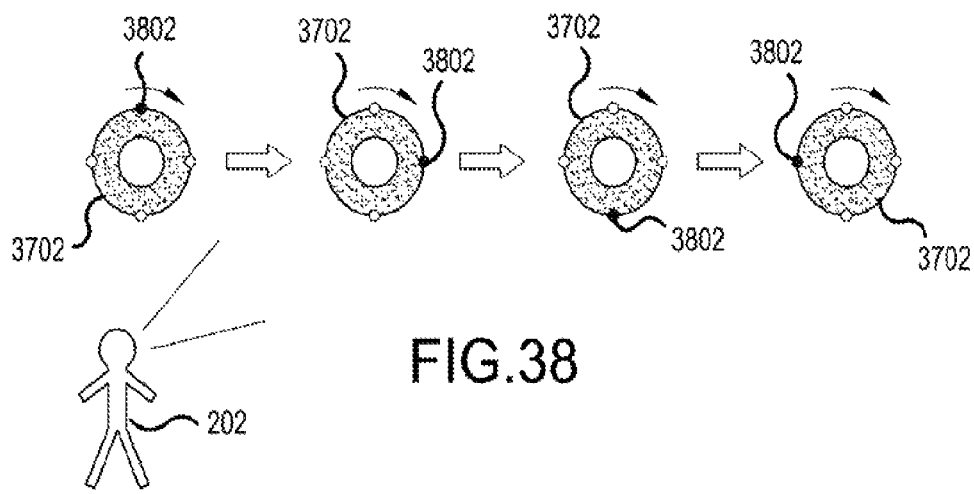
FIG. 38 illustrates user's 3$^{rd}$ person view of a physics engine simulation of collision and collision detection effects on an object according to an aspect of an embodiment of the present invention.
Figure 39:
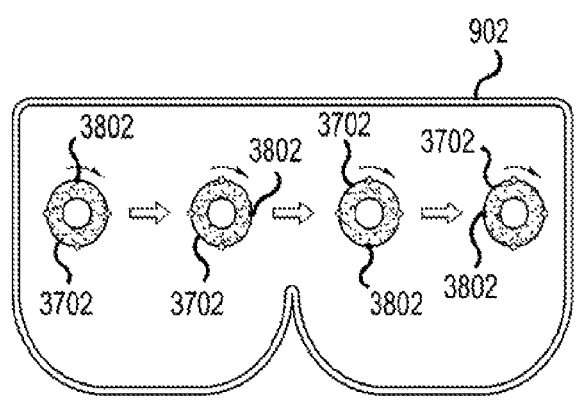
FIG. 39 illustrates object thought animation capture step by step from 3$^{rd}$ person POV according to an aspect of an embodiment of the present invention.
Figure 40:
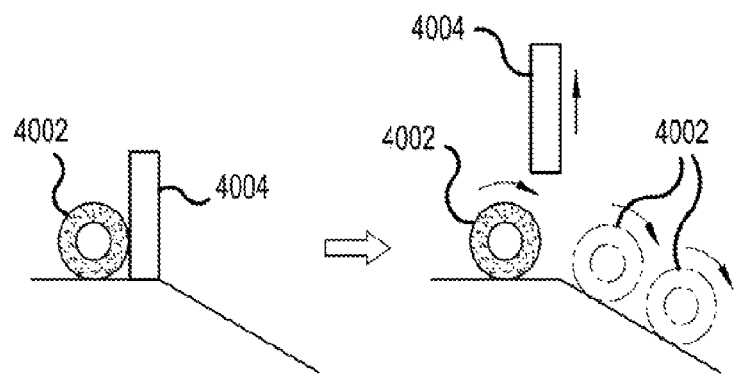
FIG. 40 illustrates physics reaction "If statement" example for software event trigger according to an aspect of an embodiment of the present invention.
Figure 41:
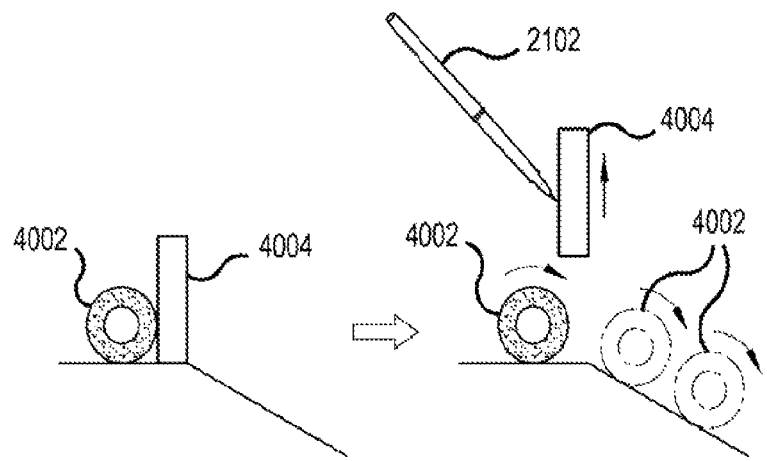
FIG. 41 illustrates physics reaction "If statement" example for interaction device event trigger according to an aspect of an embodiment of the present invention.

Referring now to FIGS. 38-39, object thought animation capture step by step from a third person's POV according to aspects of embodiments of the present invention are illustrated or shown while FIGS. 40-41 illustrate physics reaction "If statement" example for a software event trigger and physics reaction "If statement" example for interaction device event trigger according to aspects of embodiments of the present invention are all shown. The physics engines as mentioned previously calculate possible object movement outcomes based on the user defined physical properties. Users are able to use preset physics engines or import custom physics engines in order to modify simulated outcome capabilities. An example of custom physics engines being applied could be an environment that simulates moon atmospheric characteristics that are different than those of earth. Users modify physics calculations by adjusting an object's physical property values. Using the Display Environment 600, user 202 may experience real time dynamic reactions that are similar to real world reactions.

Object Thought simulates artificial intelligence for objects. The object thought user interface allows users to capture frame by frame object animation to be reproduced based on a user's action triggered by an interaction device or an automated event trigger provided by the software. Capturing movements consists of a user moving an object then using the software to capture step by step calculation of object 3702's Snap point 3802 position changes, as seen in FIGS. 38 and 39. Changing the physical characteristics of object such as size, and shape are also captured by step by step manipulation. After capturing an objects frame by frame animation a user configures the physics reaction logic to simulate an object's logical action, reaction and general movement capabilities. The Physics reaction logic utilizes the captured object thought animations and applies if statement formula logics to determine how an object will react to event triggers initiated by the software and/or user 202. If statement formulas create a step by step process that consists of an initiator's commands (initiating event) and actions. "If statements" generally have an initiating event; then a reaction or reactions; with clauses, parameters and variables that create multiple logical outcomes. An example could be if a user moves object 4004 (initiating event) that tire 4002 is propped up against then tire 4002 will rollaway (object thought rotate action), as seen in FIG. 40 and FIG. 41. This "If statement" based artificial intelligence (Physics Reaction Logic) enables an object to have scripted actions and reactions for dynamic situations.

The invention may include, in one aspect of an embodiment, an Object Solution Environment (OSE) user interface which may provide tools for users to create process solutions (HUD applications or media content) which may incorporate custom action formulas, advanced scientific equations, menus, content and media types (images, videos, audio, etc.). The Object Solution may be packaged for re-use and interaction by other HUD users similar to the concept of mobile application and/or computer programs.

Audio playback may also be affected by the physical location of display device 902. Sound generated by objects are simulated by the software to provide user 202 with the experience of hearing 3-D sound affects while navigating Display Environment 600. As display device 902 changes its proximity in relation to Display Environment 600, the software generates sound playback changes. Using head-related transfer functions and reverberation, the changes of sound on its way from the source (including reflections from walls and floors) to the listener's ear can be simulated. These effects include localization of sound sources behind, above and below the listener. Some 3-D technologies also convert binaural recordings to stereo recordings. Morrow Sound True 3-D converts binaural, stereo, 5.1 and other formats to 8.1 single and multiple zone 3-D sound experiences in real time.

Figure 42:
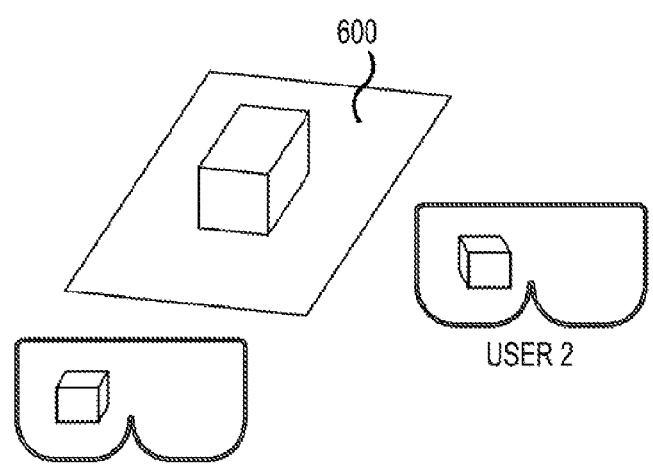
FIG. 42 illustrates multiple users from 1$^{st}$ person co-design according to an aspect of an embodiment of the present invention.
Figure 43:
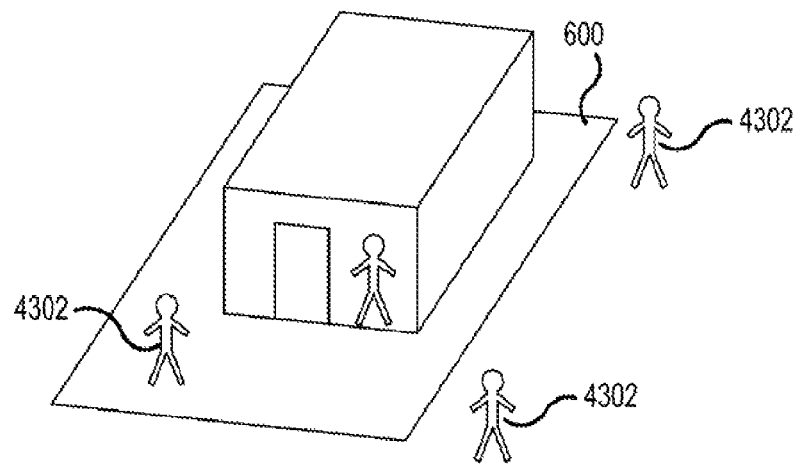
FIG. 43 illustrates multiple users from 3$^{rd}$ person co-design according to an aspect of an embodiment of the present invention.

Referring now to FIGS. 42 and 43, multiple users as seen from a 1st and 3rd person's perspective during the multiple users' co-design activities according to aspects of embodiments of the present invention are shown. The present invention provides aspects of collaboration amongst multiple users 4302 that enable interaction, navigation, and view of Display Environments simultaneously. This collaboration may, in one aspect, require an internet or local server connection to enable users to have the ability to access 3-D environment data at one time. Multiple user 4302 access will provide the ability to "co-design". "Co-designing" is the process during object design and displaying where users can design objects simultaneously and provide live markups such as comments and edits about the objects and or environment. Furthermore the co design feature will be utilized as a key tool for multiple users to view or present aspects of a Display Environment. In one aspect of an embodiment of the present invention, users may have the ability to add comments and drawings to an environment to store notes and track modifications. Applicable software, such as CAD software may also allow users to co-design objects in one environment. When the CAD software is processed externally via a web server this allows multiple users to design objects collaboratively. Each user POV of the Display Environment will have its own unique perspective of different display angles and objects being displayed, as seen in FIG. 42 and FIG. 43.

Figure 44:
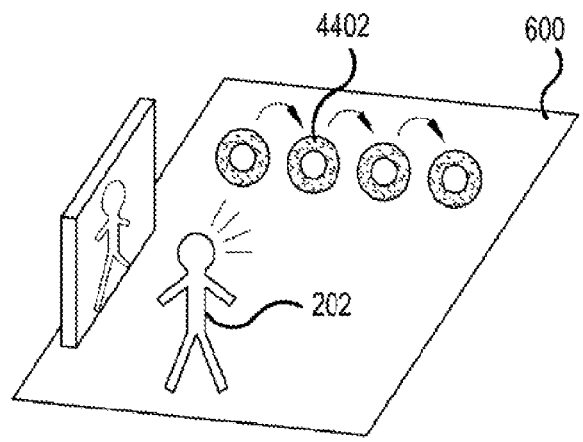
FIG. 44 illustrates an image being interacted with while causing a tire to roll/bounce which also generates audio according to an aspect of an embodiment of the present invention.
Figure 45:
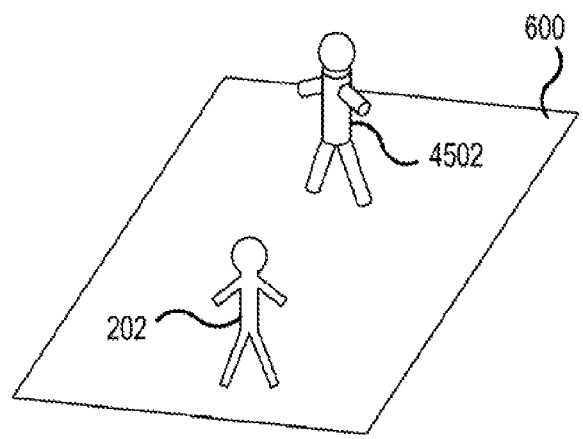
FIG. 45 illustrates a 3-D video of person viewed/interacted with in a display environment according to an aspect of an embodiment of the present invention.

Referring now to FIGS. 44-45, FIG. 44 illustrates an image 4402 being interacted with causing a tire to roll/bounce which also generates audio according to an aspect of an embodiment of the present invention while FIG. 45 illustrates a 3-D video 4502 of person viewed/interacted with in display environment 600 according to an aspect of an embodiment of the present invention The solution design process consists of the packaging of designed objects, physics, and Al with menus and media content. This process allows users to view, create, store, share and interact with Display Environments or objects designed to be displayed on a display device as an application. Interactive menus and actions provide a variety of options that can be applied by users to initiate stored software commands. Software commands in this instance can be either pre-designed actions/event triggers or user defined object physics reaction logic imitating events. Interactive devices have the capability to initiate these software commands creating a source of user interaction. Also, media content such as images, audio, and video are used to further enhance a user's interaction and experience. An example can be a user defined image that triggers the event of a 3-D model of a tire rolling action combined with sound effects, as seen in FIG. 44. Also an example could be a 3-D captured video of a person that users can interact with and navigate around with a display device similar to this inventions 3-D object capabilities, as seen in FIG. 45.

An exemplary application of an aspect of an embodiment of the present invention will now be illustrated. First, a user may designate a workspace using location sensors to determine the outline/boundaries for the Display Environment's OSE workspace. Users may then use the Design tools to begin manipulating shapes to create a desired objects physical dimensions. Properties may then be applied to the object(s) in which case the user may select physical properties for each object to create a relationship with the OSE physics. The user would then have to configure physics for the OSE that is being simulated. The user may then design the object thought to simulate artificial intelligence for the objects. The "thought" user interface would allow the user to capture movements of objects by frame by frame animation to be reproduced based on a user's action triggered (or assigned by the user) by an interaction device or an automated event triggered provided by the software. The user then applies the logics, and/or animations to specific objects to create movement. Optionally, the user may view logistics and other statistics. The packaged project may then be saved and shared with others.

The invention has been described in detail with particular reference to certain preferred embodiments thereof, but it will be understood that variations and modifications can be effected within the spirit and scope of the invention.

What is claimed is:

1. A computer program product comprising a non-transitory computer usable medium having control logic stored therein for causing a computer to enable a first person augmented reality view of 3-dimensional objects, comprising:
   computer readable program code for initializing communication between a display device and at least one location sensor, wherein said at least one location sensor is positioned externally away from said display device;
   computer readable program code for receiving sensor data from said at least one location sensor;
   computer readable program code for generating an augmented reality environment using data from said at least one location sensor, wherein said augmented reality environment comprises a spatial origin point that is determined from an actual position of said at least one location sensor;
   computer readable program code for incorporating a 3-dimensional target object within said augmented reality environment;
   computer readable program code for applying a Cartesian coordinate grid to said augmented reality environment wherein the Cartesian coordinate grid is defined from the spatial origin point and the display device synchronizes with said at least one location sensor and a CPU of said display device, and by execution of the computer readable code, calculates a distance between said at least one location sensor and said display device using a computer generated lateral line and wherein said lateral line intersects a computer generated vertical line passing through said spatial origin point; and
   computer readable program code for displaying said target object within said augmented reality environment in a first person augmented reality view.

2. The computer program product of claim 1, further comprising computer readable program code for enabling manipulation of said target object.

3. The computer program product of claim 1, further comprising computer readable program code for changing the display of said target object to reflect a change in position or orientation of said display device.

4. The computer program product of claim 1, wherein said sensor data includes data regarding said augmented reality environment's physical characteristics, scale, position and orientation.

5. The computer program product of claim 1, further comprising computer readable program code for enabling superimposition of a 3-dimensional image over said augmented reality environment.

6. The computer program product of claim 1, wherein said augmented reality environment is generated by virtue of said at least one location sensor's positioning.

7. The computer program product of claim 1, further comprising computer readable program code for providing a virtual representation of said Cartesian coordinate grid.

8. The computer program product of claim 7, wherein said virtual representation is done by synchronization between said display device and said at least one location sensor.

9. The computer program product of claim 1, further comprising computer readable program code for rendering real time effects to simulate photorealistic user interfaces.

10. The computer program product of claim 1, further comprising computer readable program code for simulating a user's presence within said augmented reality environment.

11. The computer program product of claim 1, further comprising computer readable program code for enabling application of physical attributes to said target object.

12. The computer program product of claim 11, further comprising computer readable program code for simulating effects of said application of physical attributes on said target object.

13. The computer program product of claim 12, further comprising computer readable program code for displaying said simulated effects of said physical attributes on said target object.

14. The computer program product of claim 1, wherein said target object is an image of an actual object as captured by said display device.

15. The computer program product of claim 1, wherein said target object is a 3-dimensional design created within said augmented reality environment by a user.

16. The computer program product of claim 1, further comprising computer readable program code for enabling motion capturing and proximity sensing by said display device.

17. The computer program product of claim 1, further comprising computer readable program code for enabling participation of multiple users within said augmented reality environment.

18. The computer program product of claim 17, further comprising computer readable program code for enabling co-designing by said multiple users.

19. The computer program product of claim 1, further comprising computer readable program code for generating an inner dimension user point of view of said augmented reality environment thereby enabling said user to view and navigate within said augmented reality environment.

20. The computer program product of claim 19, wherein said computer readable program code comprises computer readable program code for combining said display device's location and said augmented reality environment's properties with said display device's focal point.

21. The computer program product of claim 1, further comprising computer readable program code for enabling simulation of zooming in towards or zooming out from said target object by said display device.

22. The computer program product of claim 1, further comprising computer readable program code for enabling navigation of said augmented reality environment.

23. The computer program product of claim 22, wherein said computer readable program code comprises computer readable program code for sensing motion by said display device; and computer readable program code for determining position of said display device in relation to its proximity to said at least one location sensor.

24. The computer program product of claim 1, further comprising computer readable program code for generating and displaying possible target object outcome based on application of physical properties on said target object.

25. The computer program product of claim 1, further comprising computer readable program code for generating sound playback based on said display device's change in its proximity to said augmented reality environment.

26. The computer program product of claim 1, further comprising computer readable program code for determining said spatial origin point.

27. The computer program product of claim 26, wherein said computer readable program code further comprises:
   computer readable program code for determining the width and length variables of a positioning layout formed by said at least one location sensor; and
   computer readable program code for dividing said width and length variables by 2.

* * * * *